United States Patent [19]

Marchioro

[11] 4,291,447
[45] Sep. 29, 1981

[54] CONTROLLED DEFLECTION ROLL

[75] Inventor: Ignazio Marchioro, I-Schio, Italy

[73] Assignee: Escher Wyss Limited, Zürich, Switzerland

[21] Appl. No.: 91,512

[22] Filed: Nov. 5, 1979

[30] Foreign Application Priority Data

Nov. 15, 1978 [CH] Switzerland .................. 11724/78

[51] Int. Cl.³ ............................................ B21B 13/02
[52] U.S. Cl. ............................................ 29/116 AD
[58] Field of Search ....... 29/116 AD, 113 AD, 116 R

[56] References Cited

U.S. PATENT DOCUMENTS

| | | | |
|---|---|---|---|
| 4,030,177 | 6/1977 | Hold | 29/116 AD |
| 4,213,232 | 7/1980 | Biondetti et al. | 29/116 AD |

*Primary Examiner*—Peter P. Nerbun
*Attorney, Agent, or Firm*—Werner W. Kleeman

[57] ABSTRACT

A controlled deflection roll having a roll shell rotatably mounted at its ends at a stationary roll support. Pressure or support elements are located between the roll shell and the roll support. The bearing or mounting arrangement of the roll shell at the roll support is provided with play, in a direction opposite to the direction of application of the force exerted by the pressure elements. In such play there is effective a force opposing the direction of the force of the pressure elements. If this force is exceeded by the force of the pressure elements, then a control device limits the force exerted by the pressure elements to a value which is not dangerous for the roll shell. According to a preferred construction the control device is constituted by a hydraulic shutoff element which, in the case of a hydraulic controlled deflection roll, opens an outflow channel leading from the pressure line or conduit, and thus, lowers the pressure effective in the pressure line.

9 Claims, 7 Drawing Figures

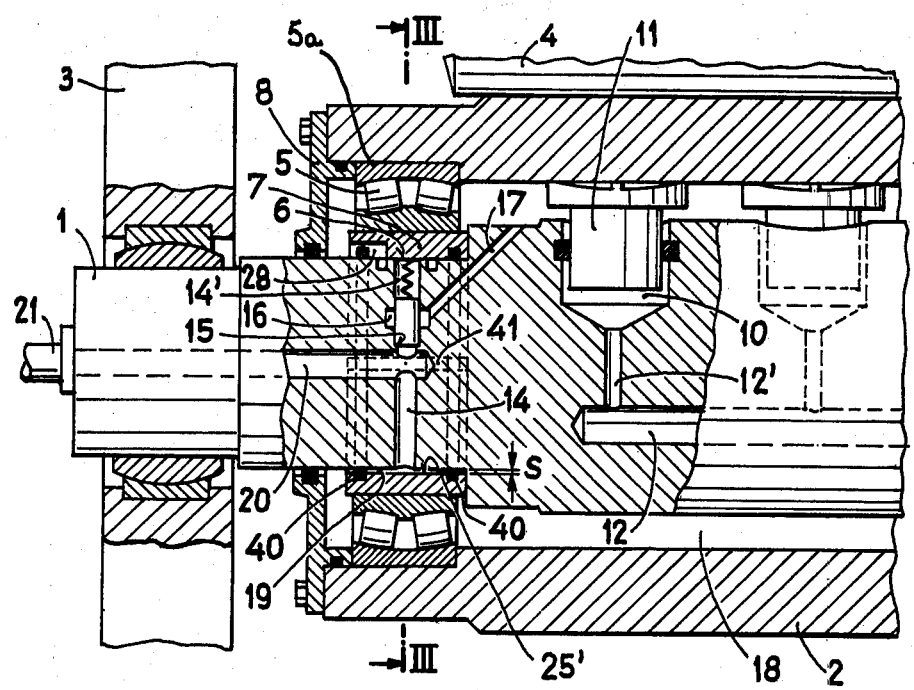
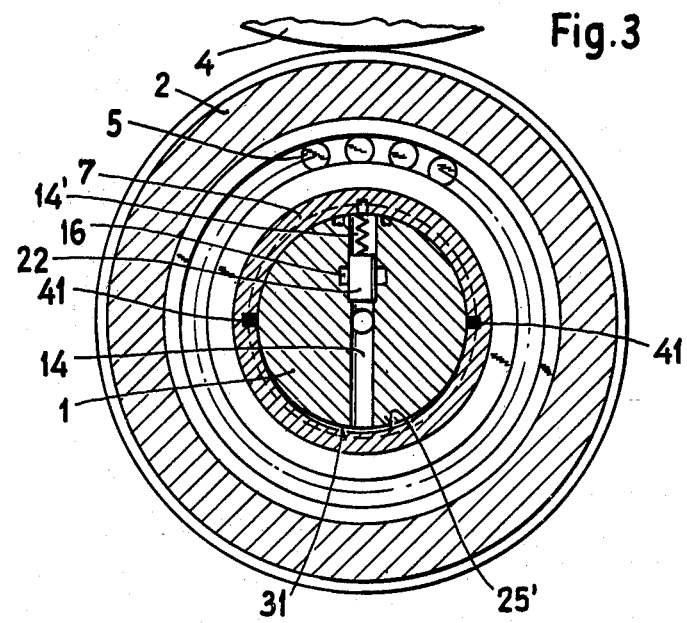

CONTROLLED DEFLECTION ROLL

BACKGROUND OF THE INVENTION

The present invention relates to a new and improved construction of a controlled deflection roll, sometimes referred to in the art as a roll with bending or sag compensation.

Generally speaking, the controlled deflection roll of the present development is of the type comprising a stationary roll support or core and a roll shell rotatable about the stationary roll support. The roll shell itself is rotatably mounted at its ends at the roll support in a bearing or support arrangement. At least one pressure or support element is located between the roll support and the roll shell. By means of this pressure or support element the roll shell is rotatably supported at the roll support, and the pressure element is effective, with its supporting force, in a force direction which passes through a pressure plane extending through the lengthwise axis of the roll shell.

One such type controlled deflection roll has been taught to the art, for instance, from U.S. Pat. No. 3,802,044, granted Apr. 9, 1974. With this construction of controlled deflection roll, which has been found to be quite satisfactory in practice, there are provided as the pressure or support elements pistons or punches subjected to a hydrostatic contact pressure and simultaneously forming a hydrostatic bearing with the inner surface of the roll shell. The pistons can all be impinged with the same hydrostatic pressure, or different pressures can act upon groups of such pressure elements or even individual ones of such pressure elements.

It has been found that with a controlled deflection roll of this type, during its assembly into a rolling mill, the danger exists of fracturing the roll shell when the hydrostatic pressure or support elements are impinged with a pressure while there is absent any counter support roll or the surface of such pressure elements is spaced too far from the roll shell. For instance, this situation can arise after regrinding the roll shell of a rolling mill.

SUMMARY OF THE INVENTION

Therefore, with the foregoing in mind it is a primary object of the present invention to provide a new and improved construction of controlled deflection roll which is not associated with the aforementioned drawbacks and shortcomings of the prior art constructions of controlled deflection rolls as noted above.

Another and more specific object of the present invention aims at providing a new and improved construction of a controlled deflection roll where this danger of rupture or fracture of the roll shell can be effectively avoided, or at the very least appreciably minimized, and wherein there is provided a safety device precluding damage to the roll shell due to the application of the internal forces of pressure elements when there are not present any counterforces.

Now in order to implement these and still further objects of the invention, which will become more readily apparent as the description proceeds, the controlled deflection roll of this development is manifested by the features that the bearing or mounting arrangement of the roll shell at the stationary roll support exhibits play in the contact or pressure plane and in a direction opposite to the direction of application of the force by the pressure elements. This play enables a movement to be carried out between the bearing arrangement in relation to the roll support out of a work position in a direction opposite to the direction of force application. Furthur, there is provided a yieldable force or power applying element which retains, with a predetermined force, the bearing arrangement at the roll support in such work position. Between the roll support and the roll shell there is arranged a control means or control device which, upon displacement of the bearing arrangement out of the work position at the roll support against the force of the force applying element, limits the support force of the pressure or support element.

The force applying element is dimensioned such that it retains the bearing arrangement in the work position until there is attained a predetermined force which is applied by the pressure elements and which is not dangerous for the roll shell. As soon as this force is exceeded, then the force of the force applying element is overcome and the bearing arrangement is moved out of the work position, whereby the control device is activated. Thereafter, the control device limits the support force exerted by the pressure element to a value which is innocuous for the roll shell, for instance by limiting the pressure of the hydraulic pressurized fluid medium which is infed to the pressure or support element or elements.

The force applying element can be designed in any random fashion, and, for instance, can contain a spring having a suitable magnitude of its applied force. However, it is preferable if the force applying element is constituted by a hydraulic pressure compartment or chamber arranged between the bearing arrangement and the roll support and connected with a source of hydraulic pressurized fluid medium at a predetermined pressure which is governed by a pressure regulator. Apart from the fact that a hydraulic pressure chamber or compartment can develop a greater amount of force than a spring, it is additionally possible to adjust or set the desired force from the outside with the aid of the pressure regulator.

As far as the control device is concerned this could be contructed, for instance, as an electrical terminal switch. Preferably, there is however provided a hydraulic shut-off element which, during movement of the bearing arrangement out of the work position in the same direction as the direction of the force applied by the pressure element or elements, opens a flow path leading from the pressure line at which it is connected.

According to a particularly advantageous construction the shutoff element can be formed by a surface of the bearing arrangement. The shutoff element, in the work position, closes a bore in the roll support which leads to such surface. Such construction has, on the one hand, the advantage that it is extremely simple and, on the other hand, is effective already in the presence of the smallest lift-off movement of the bearing arrangement from the roll support.

In order to increase the effectiveness of the system the shutoff element can have operatively associated therewith a control slide which is sealingly moveable in a bore. The control slide closes an outflow channel branching laterally off of the bore and can be actuated through servo action by the first shutoff element. In this way in the presence of the smallest lift-off or displacement movement it is possible to open, by means of the control slide, a large flow cross-section.

The pressure chamber or compartment forming the force applying element can preferably be formed by a gap, in other words by play, which is provided between the stationary roll support and the bearing arrangement. In this way it is possible with minimum expenditure of means, solely due to the arrangement of a seal, to obtain a pressure chamber or compartment having the maximum possible effective cross-sectional area.

In principle there exist two possibilities in this regard.

Firstly, the stationary roll support can be provided at the location of the bearing arrangement with a substantially cylindrical outer surface, and the bearing arrangement contains a ring member or ring which bears at the cylindrical outer surface. This ring member is provided with an oval bore having two radii which are mutually offset by the gap size in the sense of increasing the external dimension. This embodiment can be easily fabricated, since the journal of the stationary roll support is cylindrical and the oval opening is limited to a ring member of the bearing arrangement.

However, it is also possible to provide the stationary roll support, at the location of the bearing arrangement, with an outer surface composed of two substantially cylindrical surfaces having the same radii, the center of which is offset by the size of the gap in the sense of reducing the external dimension. In this case the bearing arrangement possesses a substantially cylindrical surface which surrounds such surfaces. Moreover, with this arrangement, while the fabrication of the outer surface of the journal at the stationary roll support is somewhat more complicated, nonetheless the ring member, under circumstances, can be directly formed by the inner ring or race of the roller bearing arranged at this location.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 2 is an enlarged fragmentary sectional view of part of the controlled deflection roll shown in the arrangement of FIG. 1;

FIG. 3 is a cross-sectional view of the arrangement of FIG. 2, taken substantially along the line III—III thereof;

DETAILED DESCRIPTION OF THE PREFERRED EMBODIMENTS

Figure 1:
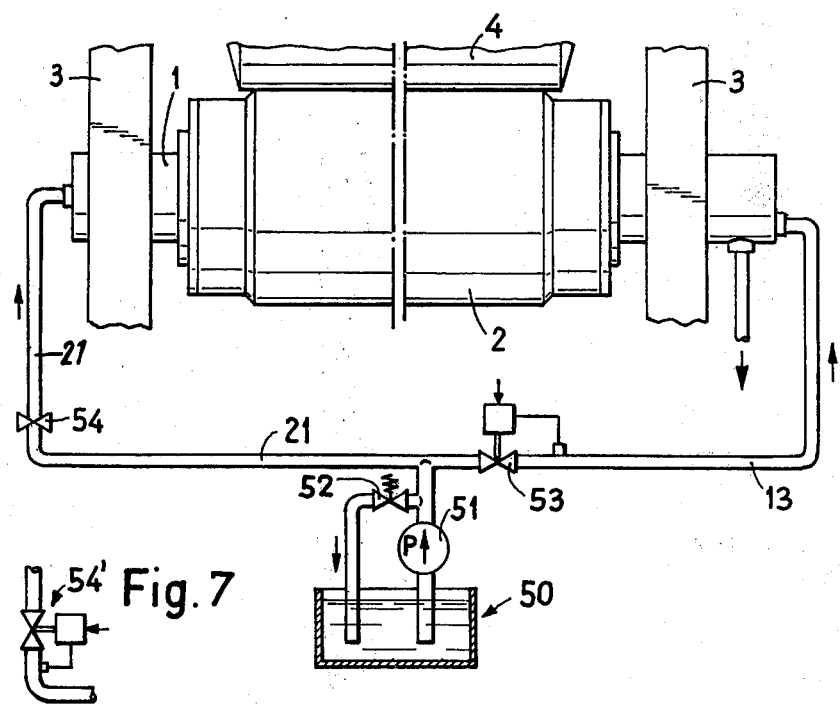
FIG. 1 is a schematic fragmentary sectional view of part of a rolling or roller mill containing a controlled deflection roll constructed according to the invention, a counter support roll and further illustrating the hydraulic circuitry for such controlled deflection roll.

Describing now the drawings, in FIG. 1 there is illustrated a controlled deflection roll comprising a stationary roll support 1 and a roll shell 2 mounted to be rotatable about such stationary roll support 1. As already mentioned, the controlled deflection roll can be constructed in the manner disclosed in the aforementioned U.S. Pat. No. 3,802,044, granted Apr. 9, 1974 to which reference may be readily had and the disclosure of which is incorporated herein by reference. In such U.S. patent the controlled deflection roll not only is provided with a hydrostatic support arrangement of the roll shell, but also there is provided a hydrostatic bearing or mounting of the inner surface of the roll shell at piston-like pressure or support elements. Yet, it is possible to however also employ pressure or support elements having conventional hydrodynamic bearing or mounting thereof, and generally speaking, even other types of pressure elements since the latter do not actually constitute the actual subject matter of the invention as far as their details are concerned.

As will be further evident by referring to FIG. 1, the ends of the roll support 1 are supported in an only schematically indicated framework or frame means 3 of a roller or rolling mill or the like. The roll shell 2 coacts with a counter support roll or counter roll 4 which can be equipped with a not particularly illustrated contact device for forming a contact pressure. However, it is to be understood that a number of counter support rolls can be provided, for instance in a calender, wherein, for instance, the last one thereof is provided with a contact device. Hence, there can be provided an outer contact device, for instance equipped with cylinder means. However, it is also possible to utilize a controlled deflection roll which itself is structured to be suitable for forming the contact force, for instance as the same has been disclosed in U.S. Pat. No. 3,885,283, granted May 27, 1975, to which reference may be had and likewise the disclosure of which is incorporated herein by reference.

With reference now made to FIG. 2 it will be seen that the roll shell 2 is mounted by means of roller bearings 5 or any other equivalent anti-friction bearing means at the roll support 1. Between the inner ring or race 5a of the roller bearing 5 and an outer surface 6 of the roll support 1 there is arranged an intermediate ring 7. The outer end of the roll shell 2 is sealingly closed by a cover or closure member 8. Within bores or chambers 10 of the roll support 1 there are sealingly guided hydrostatic pressure or support elements 11, here shown in the form of pressure pistons which, for instance, may be structured in the manner taught in the aforementioned U.S. Pat. No. 3,802,044, granted Apr. 9, 1974. The bores 10 are connected by means of communication or connection bores 12' with a common distributor bore 12 which, in turn, is connected with an external infeed line or conduit 13 for the infeed of any suitable hydraulic pressurized fluid medium, typically for instance oil, as best seen by referring to FIG. 1.

According to the invention there is formed in the roll support 1 of the controlled deflection roll a radial bore 14 with which merges a bore 14' of larger diameter. Between the widened or enlarged bore 14' and the bore 14 there is located a step constituting a valve seat 15. Above the valve seat 15 the bore 14' is surrounded by a groove 16 from which leads an inclined bore 17 into the intermediate space or chamber 18 disposed between the roll support 1 and the roll shell 2. The bore 14 is connected by means of a bore 20 with a line or conduit 21 through which flows the hydraulic pressurized fluid medium.

Figures 4, 7:
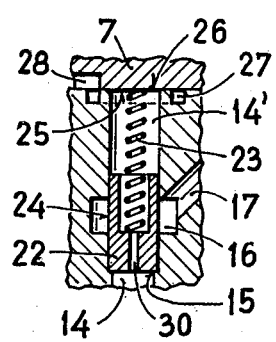
FIG. 4 is a detailed sectional view of part of the arrangement of FIG. 2 on an enlarged scale.
FIG. 7 is a fragmentary detail of the arrangement of FIG. 1 shown in modification wherein the throttle thereof is replaced by a pressure regulating valve.

Referring now to FIG. 4, there is arranged and guided with slight play in the bore 14' a combined slide and valve body 22. This slide valve or slide body 22, in the illustrated position, is urged by the force of spring 23 against the valve seat 15 and in this way obturates the bore 14. At the same time, in this position, it closes the groove 16 by means of its outer surface 24, and thus, interrupts the flow communication between the bore 14 and the bore 17. The spring 23 is supported at an inner surface 25 of the intermediate ring 7, which simultaneously closes the mouth or opening 26 of the bore 14' in the illustrated position. The mouth 26 of the bore 14', which together with the surface 25 likewise forms a shutoff element, as will be apparent from the further description to follow, is surrounded by an annular or ring-shaped groove 27, from which a linear groove 28 leads outwardly from the ring 7. The slide body or slide valve 22, as also seen by reverting to FIG. 4, is equipped with a throttle bore 30 which flow communicates both of the ends of such slide body 22 with one another, and therefore, also the bores 14 and 14' with one another. As best seen by referring to FIG. 2, at the side of the roll support 1, facing away from the bore 14', a gap 19 is located between the roll support 1 and the intermediate ring 7. By referring to FIG. 5 it will be recognized that the gap 19 can be formed in that, the roll support 1, at the location of its mounting by means of the roller bearing 5 and the intermediate ring 7, has a substantially cylindrical outer surface 31 having a diameter D and the lengthwise axis A. On the other hand, the bore 25a of the intermediate ring 7 consists of two surfaces 25 and 25' having the axes A and A' which are mutually offset from one another in the contact or pressure plane E, through which passes the direction of the force K exerted by the pressure or support elements 11, by an amount S. The diameter of both surfaces 25 and 25' is the same and correspond to the outer diameter D of the journal of the roll support 1. As also recognized by viewing FIG. 5 the degree of the offset spacing S of the axes A and A' of the bore surfaces 25 and 25' also governs the size of the gap 19. In principle this gap size S can be very small and, for instance, can amount to only a few tenths of a millimeter.

FIGS. 2 and 3 furthermore show that the surface 25' is surrounded by the seals or seal means 40 and 41, so that the gap 19 between the surfaces 25' and 31 forms a pressure chamber or compartment which is connected with the bore 14.

Figure 5:
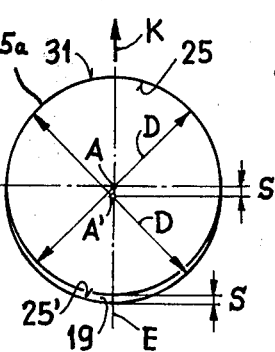
FIGS. 5 and 6 respectively show two different possibilities for designing the cylindrical surface and an oval counter surface between which there is located play.

As best seen by referring to FIG. 1, the controlled deflection roll of the present development is connected with a hydraulic pressurized fluid medium source 50 containing a pump 51. This source 50 of hydraulic pressurized fluid medium is provided with a pressure regulating valve 52 which determines the pressure in the line or conduit 21, and thus, the pressure force which is effective at the gap 19. Arranged in the line or conduit 13 is a pressure regulating valve 53, by means of which it is possible to adjust or set the force with which the roll shell 2 is supported against the force of the counter support 4. The pressure line or conduit 21 leads to bore 20, and thus, also to the bore 14 and the gap 19 arranged at the end of the roll support 1 in the bearing 5, 7 of the roll shell 2. The pressure, prevailing under the influence of the pressure regulating valve 53 in the line 21, together with the hydraulically effective size of the surface of the gap 19, determines the force with which the surfaces 25 and 31, as best seen in FIG. 5, are pressed against one another, and the mouth or opening 26 of the bore 14' remains closed by the surface 25. Additionally, as also seen be referring to FIG. 1 a throttle means or throttle valve 54 or equivalent structure is arranged in the line or conduit 21.

During normal operation of the controlled deflection roll the force of the pressure or support elements 11 is chosen such that it is essentially compensated by the contact force of the counter support roll 4, so that the bearing arrangement or bearing means 5 is load relieved at both ends of the controlled deflection roll and must not support any appreciable load. The hydraulic force effective in the gap 19 presses the surfaces 25 and 31 against one another, and the mouth or opening 26 of the bore 14' remains closed. On the other hand, if for some reason the force of the pressure elements 11 is effective in the force direction K (FIG. 5), without a counter support roll 4 taking up this force with a counter force, then a corresponding load is applied to the bearing means 5. With a sufficiently large force exerted by the pressure elements 11, it will be readily appreciated that in such case rupture of the roll shell 2 would arise.

With the inventive controlled deflection roll the hydraulic force effective in the gap 19 is overcome when there prevails a predetermined but still not dangerous magnitude of the force exerted by the pressure elements 11 and which is governed by the pressure regulator 52, so that the bearing means 5, 7 moves upwardly, in the showing of FIG. 2, out of the work position at the stationary roll support 1, in other words, moves in the force direction K (FIG. 5). Consequently, the surface 25 of the intermediate ring 7 is raised from the mouth 26 of the bore 14', so that the pressurized fluid medium contained therein can flow-off through the grooves 27 and 28. Since the throttle bore 30 prevents any rapid outflow of the pressurized fluid medium, the pressure in the bore 14' is lowered, causing an upward movement of the slide body or valve 22 in the showing of FIG. 4. Consequently, the annular or ring-shaped groove 16 is opened, producing a flow communication of the bore 14 with the bore 17. The throttle means 54 prevents dropping of the pressure in the part of the line or conduit 21 arranged forwardly of the throttle means 54 and within the line 13 below a certain value. In many instances it is desired that the force of the pressure elements 11 does not drop below a minimum value which is not dangerous for the roll shell 2, so that such pressure elements can support, for instance, the inherent weight of the roll shell 2.

Figure 6:
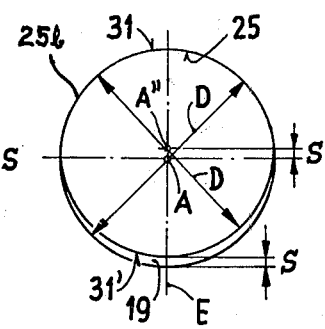

Continuing, FIG. 6 illustrates a further possibility for designing the gap 19 between the roll support 1 and the bearing or mounting arrangement of the roll shell 2. In this case the ring 7 surrounding the roll support 2 is provided with a cylindrical bore 25b having the surface 25 and a diameter D. In this case the outer surface of the roll support 1 is oval at the location of the bearing arrangement, specifically, such outer surface is formed by two surfaces 31 and 31'. These surfaces 31 and 31' again have the corresponding diameter D, but however are mutually offset at their lengthwise axes A and A'' by the offset amount S. In contrast to the embodiment of FIG. 5, where offsetting of the axes A and A' was accomplished in the sense of increasing the size of the bore in the direction of the plane E, in this case the offsetting of the axes A and A'' is accomplished in the sense of reducing the outer dimension of the surface of the roll support 1.

FIG. 7 shows a still further embodiment wherein the throttle element or throttle means 54 is replaced by a pressure regulating valve 54'. This pressure regulating valve 54', upon opening of the control element 25, 26 and the slide means 22, opens the flow out of the forwardly arranged part of the line or conduit 21 only to such a degree that in this part of the line there remains the desired lower pressure.

Although in the showing of FIG. 1, for reasons of simplification of the drawing, there has only been illustrated a single pressure line or conduit 13, it would be possible to provide a larger number of such conduits with related regulators 53, in order to supply for instance at different pressures a number of pressure zones in the controlled deflection roll. However, it is to be understood and, as already mentioned, the support elements can be designed in random fashion and the invention is not limited in any way to a hydraulic embodiment of such pressure or support elements.

While there are shown and described present preferred embodiments of the invention, it is to be distinctly understood that the invention is not limited thereto, but may be otherwise variously embodied and practiced within the scope of the following claims. Accordingly,

What I claim is:

1. A controlled deflection roll comprising:
   a stationary roll support;
   a rotatable roll shell;
   bearing means for rotatably mounting said roll shell at its ends for rotation about said stationary roll support;
   at least one pressure element arranged between said stationary roll support and said roll shell for rotatably supporting said roll shell at said stationary roll support;
   said pressure element exerting a support force at the roll shell in a force direction which substantially passes through a pressure plane extending through the lengthwise axis of the roll shell;
   said bearing means for rotatably mounting the roll shell at the stationary roll support containing play in the pressure plane in a direction opposite to said force direction;
   said play enabling movement of the bearing means in relation to the stationary roll support out of a work position in the direction of the direction exerted by said pressure element;
   a yieldable force applying element for retaining with a predetermined force said bearing means at the stationary roll support in the work position; and
   a control device arranged between said stationary roll support and said roll shell which, upon displacement of said bearing means out of the work position at the stationary roll support, limits the support force of the pressure element which is exerted against the force of the force applying element.

2. The controlled deflection roll as defined in claim 1, wherein:
   said force applying element comprises a hydraulic pressure chamber arranged between the bearing means and the stationary roll support;
   a source of hydraulic pressurized fluid medium;
   pressure regulator means for regulating the pressure of said hydraulic pressurized fluid medium to a predetermined pressure; and
   means for connecting said hydraulic pressure chamber with said source of hydraulic pressurized fluid medium.

3. The controlled deflection roll as defined in claim 2, wherein:
   said connecting means for said hydraulic pressure chamber including a hydraulic line;
   means defining a flow path leading out of said pressure line; and
   said control device comprising a hydraulic shutoff element which, during movement of the bearing means out of the work position in the direction of said force applying direction of the pressure element, opening said flow path out of said pressure line.

4. The controlled deflection roll as defined in claim 3, wherein:
   said bearing means has a surface defining said shutoff element;
   said stationary roll support having a bore leading to said surface;
   said bore having a mouth; and
   said surface closing the mouth of the bore of the stationary roll support leading to said surface in said work position.

5. The controlled deflection roll as defined in claim 4, wherein:
   said control device including a control slide means operatively associated with said shutoff element;
   said control slide means being sealingly moveable in said bore;
   an outflow channel laterally branching off said bore;
   said control slide means closing said laterally branching-off outflow channel; and
   said shutoff element actuating by a servo action said control slide means.

6. The controlled deflection roll as defined in claim 2, wherein:
   said pressure chamber is formed by a gap located between said stationary roll support and said bearing means.

7. The controlled deflection roll as defined in claim 1, wherein:
   said stationary roll support comprises a substantially cylindrical outer surface at the location of the bearing means;
   said bearing means containing a ring member bearing against said cylindrical outer surface; and
   said ring member having an oval bore with two mutually offset surfaces which are shifted relative to one another in the sense of increasing the amount of said play.

8. The controlled deflection roll as defined in claim 1, wherein:
   said stationary roll support is provided with an outer surface at the location of the bearing means;
   said outer surface containing two substantially cylindrical surfaces having the same radii;
   said two cylindrical surfaces having lengthwise axes which are offset from one another through the size of said play in the sense of reducing the amount of said play; and
   said bearing means having a substantially cylindrical surface surrounding said two surfaces of said stationary roll support.

9. A controlled deflection roll comprising:
   a stationary roll support;
   a rotatable roll shell;
   bearing means for rotatably mounting said roll shell for rotation about said stationary roll support;
   at least one pressure element arranged between said stationary roll support and said roll shell for rotatably supporting said roll shell at said stationary roll support;

said pressure element exerting a support force at the roll shell in a force direction which substantially passes through a pressure plane extending through the lengthwise axis of the roll shell;

said bearing means and said stationary roll support being coactingly structured to form therebetween a gap located essentially in the pressure plane and effective in a direction opposite to said force direction exerted by the pressure element;

said gap enabling movement of the bearing means in relation to the stationary roll support out of a work position in the direction of the force exerted by said pressure element;

force applying means for retaining with a predetermined force said bearing means at the stationary roll support in the work position; and control means arranged between said stationary roll support and said roll shell which, upon displacement of said bearing means out of the work position at the stationary roll support, limits the support force exerted by the pressure element.

* * * * *